(12) United States Patent
Yoo et al.

(10) Patent No.: US 10,686,700 B2
(45) Date of Patent: Jun. 16, 2020

(54) FLOW RULE VIRTUALIZATION APPARATUS AND METHOD THEREOF IN PROGRAMMABLE NETWORK VIRTUALIZATION

(71) Applicant: KOREA UNIVERSITY RESEARCH AND BUSINESS FOUNDATION, Seoul (KR)

(72) Inventors: Hyuck Yoo, Seoul (KR); Gyeongsik Yang, Seoul (KR); Bongyeol Yu, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 12 days.

(21) Appl. No.: 16/227,126

(22) Filed: Dec. 20, 2018

(65) Prior Publication Data
US 2020/0014621 A1    Jan. 9, 2020

(30) Foreign Application Priority Data

Jul. 6, 2018    (KR) .......................... 10-2018-0078872

(51) Int. Cl.
*H04L 12/741*    (2013.01)
*H04L 12/721*    (2013.01)

(52) U.S. Cl.
CPC .............. *H04L 45/54* (2013.01); *H04L 45/38* (2013.01)

(58) Field of Classification Search
CPC ......... H04L 45/54; H04L 45/38; H04L 47/00; H04L 43/026; H04L 41/00; H04L 45/64;
(Continued)

(56) References Cited

U.S. PATENT DOCUMENTS

| | | | | |
|---|---|---|---|---|
| 6,888,838 B1 * | 5/2005 | Ji | ............................ | H04L 45/00 370/392 |
| 7,453,883 B1 * | 11/2008 | Lynch | ..................... | H04L 45/00 370/389 |

(Continued)

FOREIGN PATENT DOCUMENTS

| | | |
|---|---|---|
| KR | 10-1658824 B1 | 9/2016 |
| KR | 10-1794719 B1 | 11/2017 |

OTHER PUBLICATIONS

Gyeongsik Yang et al., Flow Virt: Flow Rule Virtualization for Dynamic Scalability of Programmable Network Virtualization, 2018 IEEE 11th International Conference on Cloud Computing, pp. 350-358, Seoul, KR.

(Continued)

*Primary Examiner* — Nishant Divecha
(74) *Attorney, Agent, or Firm* — Hauptman Ham, LLP

(57) ABSTRACT

A flow rule virtualization method is disclosed. The flow rule virtualization method may include: (a) generating a virtualization type table, (b) selecting a virtualization type, which represents the degree of mapping between a virtual flow rule and a physical flow rule executed on a physical network, for a virtual flow rule generated from a tenant controller by using the virtualization type table, (c) virtualizing the virtual flow rule into the physical flow rule according to the selected virtualization type, (d) virtualizing the physical rule by using a rule map, and (e) installing the virtualized physical flow rule on the physical switch.

7 Claims, 16 Drawing Sheets

(58) Field of Classification Search
CPC . H04L 45/42; H04L 47/2441; H04L 47/2483; H04W 28/02; H04W 28/0273; H04W 28/10
See application file for complete search history.

(56) References Cited

U.S. PATENT DOCUMENTS

| | | | | |
|---|---|---|---|---|
| 7,936,764 B1* | 5/2011 | Krishnan | ................ | H04L 45/54 370/395.31 |
| 9,674,081 B1* | 6/2017 | Jiang | ................ | H04L 45/38 |
| 2008/0175257 A1* | 7/2008 | Winter | ................ | H04L 45/54 370/411 |
| 2012/0155467 A1* | 6/2012 | Appenzeller | ................ | H04L 49/70 370/392 |
| 2012/0281698 A1* | 11/2012 | Forster | ................ | H04L 41/0806 370/392 |
| 2013/0282867 A1* | 10/2013 | Otake | ................ | H04L 12/4641 709/217 |
| 2014/0369356 A1* | 12/2014 | Bryant | ................ | H04L 45/745 370/392 |
| 2015/0256450 A1* | 9/2015 | Yang | ................ | H04L 45/14 370/256 |
| 2016/0006663 A1* | 1/2016 | Zhang | ................ | H04L 47/29 709/234 |
| 2016/0269283 A1* | 9/2016 | Ragupathi | ................ | H04L 45/54 |
| 2017/0070427 A1* | 3/2017 | Zeng | ................ | H04L 45/24 |
| 2017/0085501 A1* | 3/2017 | Utgikar | ................ | H04L 49/25 |
| 2017/0324652 A1* | 11/2017 | Lee | ................ | H04L 67/322 |
| 2019/0280959 A1* | 9/2019 | Liu | ................ | H04L 45/122 |

OTHER PUBLICATIONS

Korean Office Action dated Mar. 7, 2019, in connection with the Korean Patent Application No. 10-2018-0078872 citing the above reference(s).

* cited by examiner

| Switch ID | Ingress port | Ethernet source | Ethernet destination | Ethernet type | IP source | IP destination | IP protocol | Source port | Destination port | Virtualization type | Priority | Range |
|---|---|---|---|---|---|---|---|---|---|---|---|---|
| * | * | * | * | * | * | * | * | * | * | Hop-merged | Low | ⇧ Entire virtual network |
| 4 | * | * | * | * | * | * | * | * | * | Hop-isolated | High | ⇧ Specific virtual switch |
| * | * | * | * | * | 10.0.0.1 | 10.0.0.2 | * | * | * | End | Mid | ⇧ Particular hosts |
| * | * | * | * | * | * | * | * | * | 12345 | Application | Mid | ⇧ Particular application |

Flow information example

FIG. 4

FLOW RULE VIRTUALIZATION APPARATUS AND METHOD THEREOF IN PROGRAMMABLE NETWORK VIRTUALIZATION

CROSS-REFERENCE TO RELATED APPLICATIONS

This application claims the benefit of Korean Patent Application No. 10-2018-0078872, filed with the Korean Intellectual Property Office on Jul. 6, 2018, the disclosure of which is incorporated herein by reference in its entirety.

BACKGROUND

1. Technical Field

The present invention relates to a flow rule virtualization apparatus and method, more particularly to a flow rule virtualization apparatus and method for providing dynamic scalability in programmable network virtualization (P-NV).

2. Description of the Related Art

In recent years, cloud computing technology has been widely adopted in numerous fields. Cloud computing may be used as a form of edge or fog computing to enable services that require advanced system management for the given resources. The various use cases of network resources in cloud centers are feasible with network virtualization, and an increasing number of tenants are demanding their own virtual network management functionalities within a cloud infrastructure because of its flexible system deployment.

However, most cloud solutions provide IaaS (infrastructure as a service) for host nodes only, and these solutions rely on host-based network virtualization (H-NV), which uses overlay networking between virtual machine monitors. With H-NV, composing an arbitrary virtual network, which consists of virtual switches and links mapped to the physical topology, as well as virtual network management and optimization are restricted for each tenant.

In contrast, programmable network virtualization (P-NV), a structure in which a network hypervisor virtualizes the entire network switch centrally, provides fully programmable virtual networks and enables flexible network management for each tenant. However, P-NV has not been widely adopted so far.

In cloud networking, a key requirement is scalability. Referring to FIG. 1A to FIG. 1C, which show graphs illustrating scalability comparisons between H-NV and P-NV, to discuss the amounts of resources consumed by H-NV and P-NV when end hosts perform the same network operations, the control channel usage and CPU (central processing unit) cycles of P-NV are 400% and 170% higher than those of H-NV, respectively. One reason for such poor scalability in P-NV is that existing network hypervisors merely install all flow rules into the physical network in a one-to-one manner.

SUMMARY

When the number of flow rules increases, the hypervisor operations and the corresponding resource consumption increase. Thus, decreasing the number of flow rules is key to improving P-NV scalability. One way to decrease the memory used to store flow rules is compression. However, compression techniques may increase delay, and moreover, most compression techniques require setting up the flow rules among all of the hosts first, thereby increasing resource consumption. Also, as the compression techniques do not consider the network management policy of the tenant and just compress flow rules blindly, there is a risk of violating tenant semantics.

Thus, an objective of the present invention is to provide a flow rule virtualization apparatus and method that are capable of improving P-NV scalability by virtualizing flow rules with a reactive forwarding scheme.

A flow rule virtualization method according to an embodiment of the invention can include the steps of: (a) generating a virtualization type table, (b) selecting a virtualization type, which represents the degree of mapping between a virtual flow rule and a physical flow rule executed on a physical network, for a virtual flow rule generated from a tenant controller by using the virtualization type table, (c) virtualizing the virtual flow rule into the physical flow rule according to the selected virtualization type, (d) virtualizing the physical rule by using a rule map, and (e) installing the virtualized physical flow rule on the physical switch.

A flow rule virtualization apparatus according to an embodiment of the invention can include: a table generation part configured to generate a virtualization type table, a of virtualization part configured to select a virtualization type, which represents the degree of mapping between a virtual flow rule and a physical flow rule executed on a physical network, for a virtual flow rule generated from a tenant controller by using the virtualization type table and virtualize the virtual flow rule into a physical flow rule executed on a physical network according to the selected virtualization type, and a pf virtualization part configured to virtualize the physical rule by using a rule map.

Certain embodiments of the invention make it possible to decrease the number of flow rules by virtualizing the flow rules, improve scalability for P-NV by decreasing control channel bandwidth and CPU usage, and satisfy diverse flow rule management policies for tenants.

Additional aspects and advantages of the present invention will be set forth in part in the description which follows, and in part will be obvious from the description, or may be learned by practice of the invention.

BRIEF DESCRIPTION OF THE DRAWINGS

FIG. 4 illustrates an example of a virtualization type table.

DETAILED DESCRIPTION OF THE INVENTION

Figure 1A:
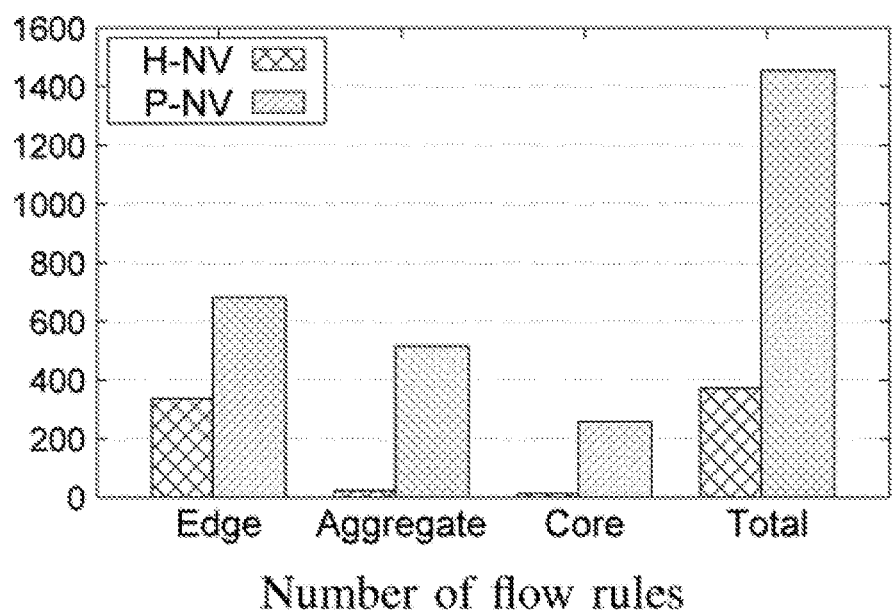
FIG. 1A to FIG. 1C show graphs illustrating scalability comparisons between H-NV and P-NV.
Figure 1B:
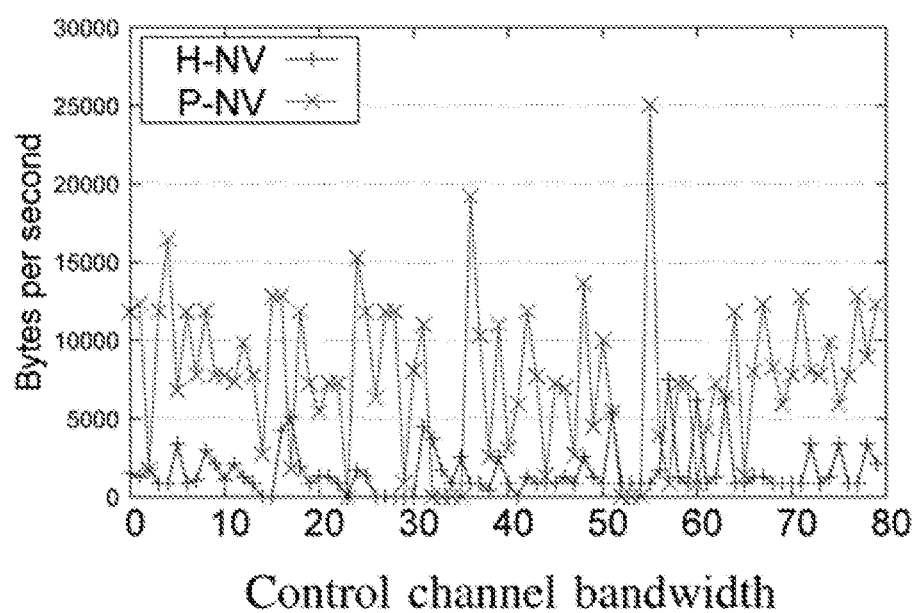
Figure 1C:
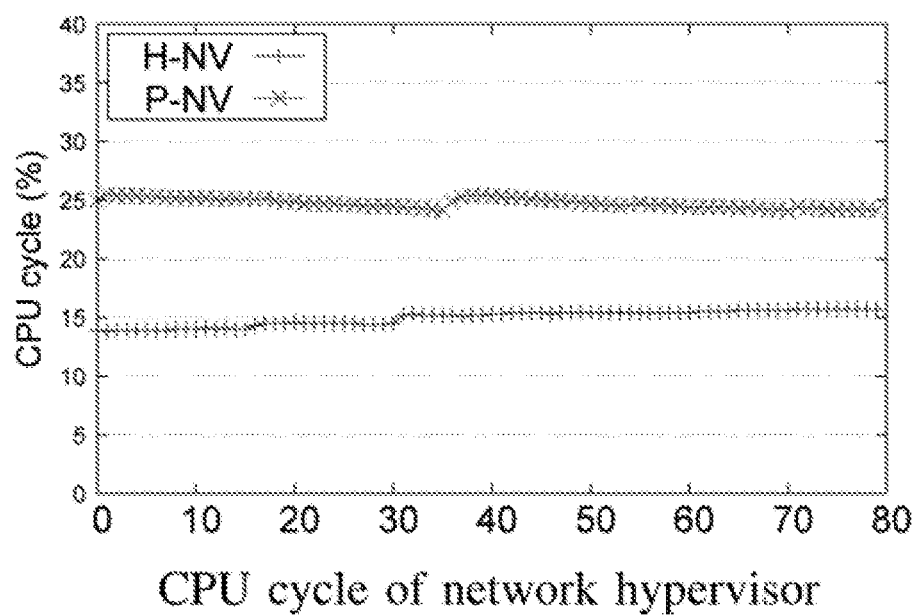

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring", and "adjacent to".

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Hereinafter, exemplary embodiments of the present invention are described in detail with reference to the accompanying drawings.

In existing P-NV, when a new connection is generated, the ingress switch of the new packet connection may send a flow rule request message to the network hypervisor. When the network hypervisor receives the flow rule request message, the message is delivered to a tenant controller (TC). The tenant controller, upon receiving the message, may calculate a forwarding path for the packet connection and may send the composed flow rules for each virtual switch to the network hypervisor. However, existing P-NV delivers the flow rule generated from tenant controllers in consideration of address and topology translation only.

To resolve the problem of scalability posed by P-NV, an embodiment of the invention aims to reduce the number of flow rules by virtualizing flow rules and decrease the subsequent provisioning of computing resources such as the control messages and CPU cycles of the P-NV hypervisor.

To this end, a rule map is used, which is a structure for managing the mapping of virtual and physical flow rules. In particular, flow rules are separated into virtual flow rules and physical flow rules for fine-grained virtualization. Then, the mapping from virtual flow rules to physical flow rules is maintained. Using this mapping, an embodiment of the invention may merge virtual flow rules into a small number of physical rules.

Figure 2:
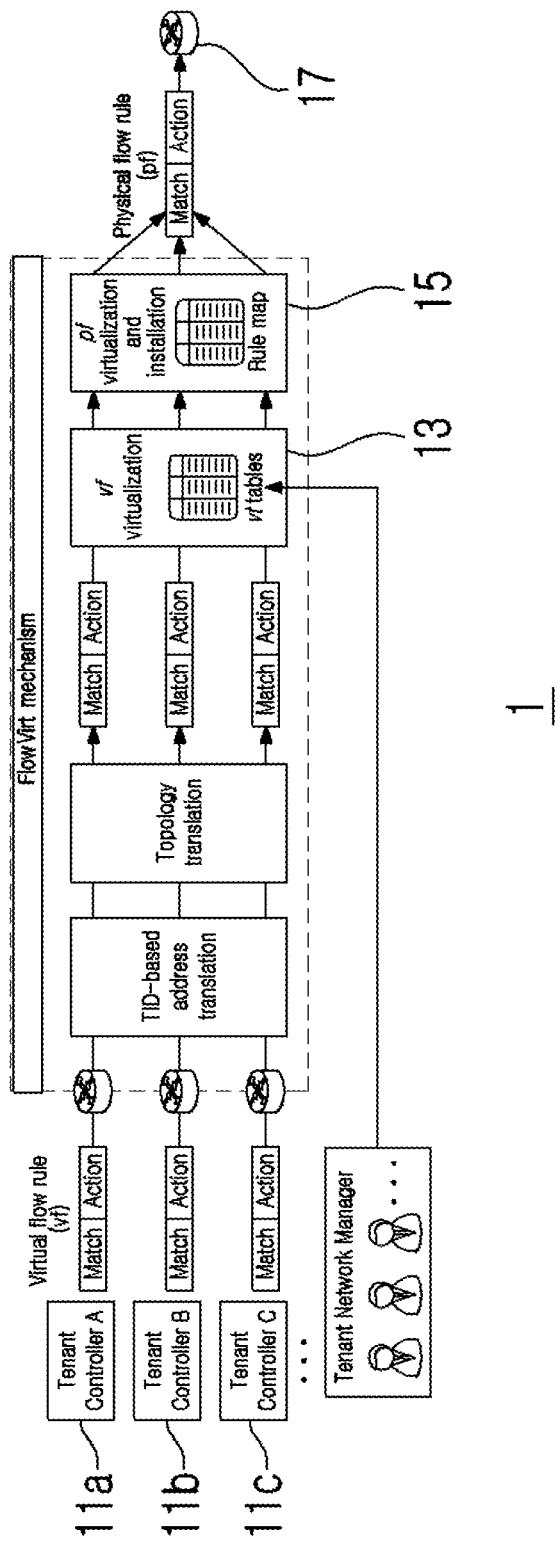
FIG. 2 conceptually illustrates a flow rule virtualization system according to an embodiment of the invention.

FIG. 2 conceptually illustrates a flow rule virtualization system according to an embodiment of the invention. Referring to FIG. 2, a flow rule virtualization system 1, which encompasses the flow rule virtualization apparatus and method according to embodiments of the invention and which can be named FlowVirt, may define the flow rules generated from tenant controllers 11a to 11c as virtual flow rules (vf) and may define the flow rules to be implemented on the physical network as physical flow rules (pf).

Here, the virtual flow rules and physical flow rules can be defined as tuples (M, A), where M can include matching information for a particular field of a packet, and A can include action information regarding actions performed for the matched packet.

According to an embodiment of the invention, the matching information of a virtual flow rule or physical flow rule can be represented as vf.M or pf.M, while the action information can be represented as vf.A or pf.A.

Then, the flow rule virtualization apparatus and method may select a virtualization type (vt) and may virtualize a virtual flow rule into a physical flow rule by using a virtualization type table 13. Here, virtualizing a virtual flow rule into a physical flow rule can mean merging at least one or more virtual flow rules according to virtualization type.

If there are physical flow rules installed on the switch so that there is a risk of collision with a physical flow rule that is to be installed, then the virtualized physical flow rules can be re-virtualized by using a rule map 15.

Finally, the flow rule virtualization apparatus and method may install the virtualized physical flow rules on the physical network including the physical switch 17.

The flow rule virtualization apparatus and method according to an embodiment of the invention are described below in further detail with reference to FIG. 3 to FIG. 8.

Figure 3:
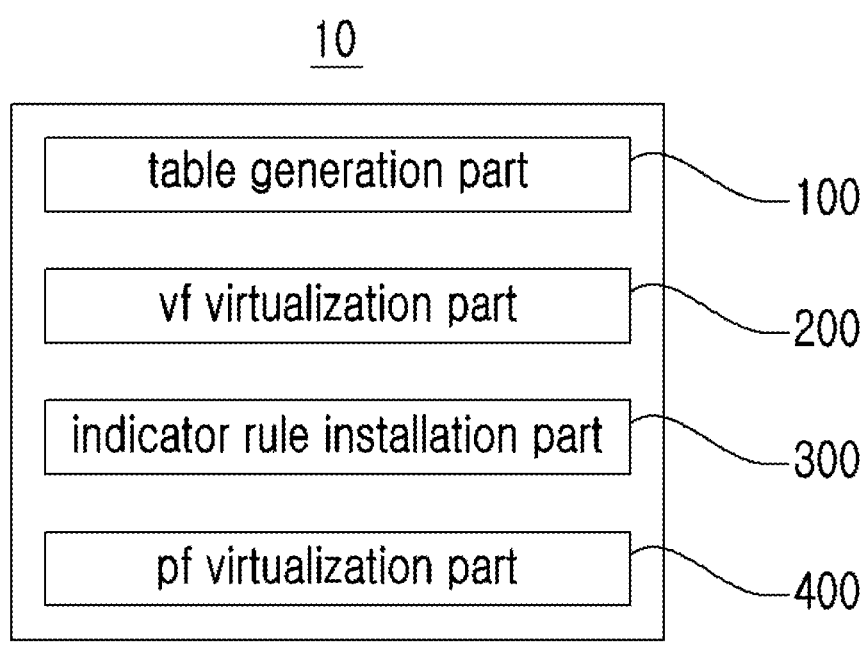
FIG. 3 is a block diagram of a flow rule virtualization apparatus according to an embodiment of the invention.

FIG. 3 is a block diagram of a flow rule virtualization apparatus according to an embodiment of the invention. Referring to FIG. 3, the flow rule virtualization apparatus 10 may include a table generation part 100, a of virtualization part 200, an indicator rule installation part 300, and a pf virtualization part 400.

The table generation part 100 may generate a virtualization type table. A virtualization type table can be allocated to each tenant.

Referring to FIG. 4, which illustrates an example of a virtualization type table, each entry of the virtualization type table can be composed of a vt policy, which is a policy by which each tenant manages the virtual network.

Each entry of a virtualization type table may include syntax for a virtualization type policy, which may include, for example, switch ID 21a, flow information 21b, virtualization type 21c, priority 21d, etc.

The switch ID 21a can represent the identifier information of the physical switch.

The flow information 21b can be information related to packet transmission and can include, for example, IP information, port information, etc.

The virtualization type 21c may represent the mapping degree (i.e., merging degree) between a virtual flow rule and a physical flow rule and can be classified as shown below in Table 1.

TABLE 1

|  | Inter-merging Off | Inter-merging On |
|---|---|---|
| Hop | Hop-isolated | Hop-merged |
| End | End | Not available |
| Application | Application | Not available |
| Arbitrary | Arbitrary | Not available |

Referring to Table 1 above, the virtualization type 21c may include five types (hop-isolated, hop-merged, end, application, and arbitrary) according to whether or not there is inter-merging between tenants and according to the level of the merging.

The merging between a virtual flow rule and a physical flow rule may be divided largely into merging within one tenant (intra-merging) and merging between tenants (inter-merging).

Intra-merging ensures isolation for the tenant. The virtualization types for intra-merging can include, based on the level of merging within the tenant, the hop vt, which is hop based, the end vt, which is end-host based, the application vt, which is application based, and the arbitrary vt, for when there is no intra-merging.

Here, the hop vt may create a physical flow rule that matches only the hop address of virtual flow rules, the end vt may create a physical flow rule that matches up to the hop and host addresses of virtual flow rules, the application vt may create a physical flow rule that matches the hop, host, and application addresses, and the arbitrary vt may not alter the matching information of the flow rules. That is, the arbitrary vt may be the same as in the previous P-NV.

Inter-merging between tenants may not ensure isolation for the tenants. With a TID (tenant identifier) allocated to each packet according to an embodiment of the invention, the hop vt can be used with inter-merging because the physical hop addresses may not be affected by TID. Thus, the hop vt can include a hop-isolated vt and a hop-merged vt. That is, the hop-isolated vt may be for intra-merging within a tenant, while the hop-merged vt may be for inter-merging between tenants.

However, with the end vt and the application vt, there is the problem of overlapping virtual addresses between tenants, because each host and application belong to a single virtual network, and with the arbitrary vt, there is the problem of uncertainty as regards how a tenant controller composes the virtual flow rule. Thus, as the end vt, the application vt, and the arbitrary vt cannot merge flow rules across tenants, these are only valid for intra-merging within a tenant, unlike the case of the hop vt.

Using this syntax, a tenant can specify the virtualization type policy for the entire virtual network, a specific virtual switch, a particular host, or a particular application.

Referring to each entry of FIG. 4, the first entry matches shows a virtualization type policy of the hop-merged vt, as the entry matches every switch, host, and application. The second entry shows a virtualization type policy of the hop-isolated vt, by specifying a particular virtual switch without specifying the flow information. The third entry shows a virtualization type policy of the end vt by specifying the host in the flow information, and the fourth entry shows a virtualization type policy of the application vt by specifying the application in the flow information.

The process and composition for virtualizing a virtual flow rule into a physical flow rule according to the virtualization type will be described later on in further detail.

The priority 21d may refer to the order in which virtualization type policies are to be applied to a virtual flow rule when multiple virtualization type policies are applicable. According to the priority 21d assigned to each virtualization type policy, when selecting the virtualization type 21c of a virtual flow rule, the virtualization type 21c of the virtualization type policy having the highest priority can be selected from among the virtualization type policies that match the virtual flow rule.

The vf virtualization part 200 may select the virtualization type for a virtual flow rule created from a tenant controller by using the virtualization type table generated at the table generation part 100 and may virtualize the virtual flow rule into the physical flow rule according to the selected virtualization type.

The selection of the virtualization type for the virtual flow rule can be performed by using a virtualization type table. More specifically, the vf virtualization part 200 may compare the virtual switch ID with the switch ID in the virtualization type table and may compare the matching field of the virtual flow rule of which merging is desired with the flow information of the virtualization type table. The comparison may yield a matching virtualization type policy from among the at least one or more virtualization type policies included in the virtualization type table, and the virtualization type of the matching virtualization type policy may be selected as the virtualization type of the virtual flow rule.

If there are a multiple number of matching virtualization type policies, the vf virtualization part 200 can compare the priority of each virtualization type policy and can select the virtualization type of the virtualization type policy having the highest priority from among the matching virtualization type policies.

When the virtualization type has been selected, the vf virtualization part 200 may merge virtual flow rules according to the selected virtualization type for virtualization to physical flow rules. As described above, virtualizing the virtual flow rules into physical flow rules can mean merging at least one or more virtual flow rules according to virtualization type.

Figure 5:
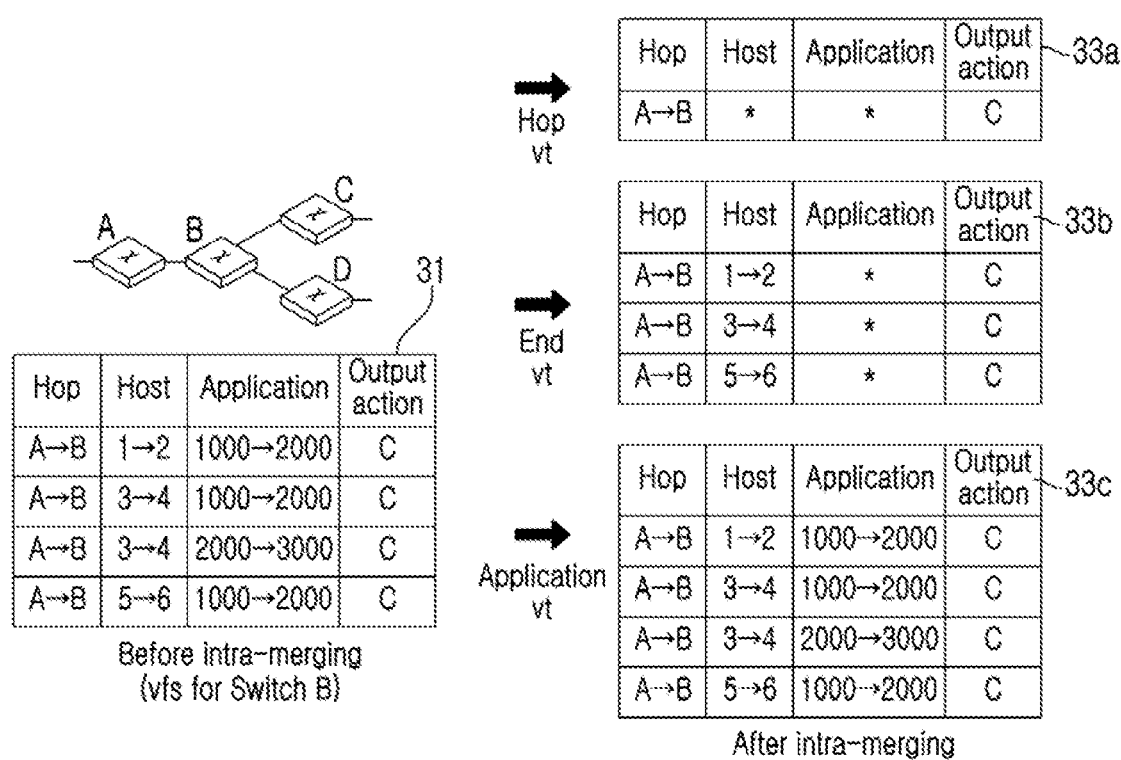
FIG. 5 illustrates an example of virtual flow rule merging.

Referring to FIG. 5, which illustrates examples of merging virtual flow rules, in a network including Switches A, B, C, and D, where traffic flows from Switches A to B, there are four virtual flow rules 31 for Switch B. These virtual flow rules 31 may be merged according to the selection of virtualization type.

For example, if the virtualization type is selected to be the hop vt, the flow information for the host and applications may be wild-carded (33a); if the virtualization type is selected to be the end vt for matching all applications, the flow information for the applications may be wild-carded (33b); and if the virtualization type is selected to be the application vt, a particular host and a particular application may be specified (33c).

The indicator rule installation part 300 may install an indicator rule on the physical switch. The indicator rule installation part 300 can install the indicator rule in cases where there is a virtualization type policy of the application vt in the virtualization type table according to an embodiment of the invention.

More specifically, in SDN (software-defined networking), the ingress switch may request a flow rule to the network hypervisor when the switch does not have any rules to process a new packet. However, when a physical flow rule having a virtualization type coarser-grained than the application vt, such as the end vt, hop-merged vt, or hop-isolated vt, for example, was previously installed on the ingress switch, a flow rule of a finer-grained virtualization type cannot be installed. Hence, the ingress switch cannot request that the network hypervisor generate a flow rule.

Figure 6:
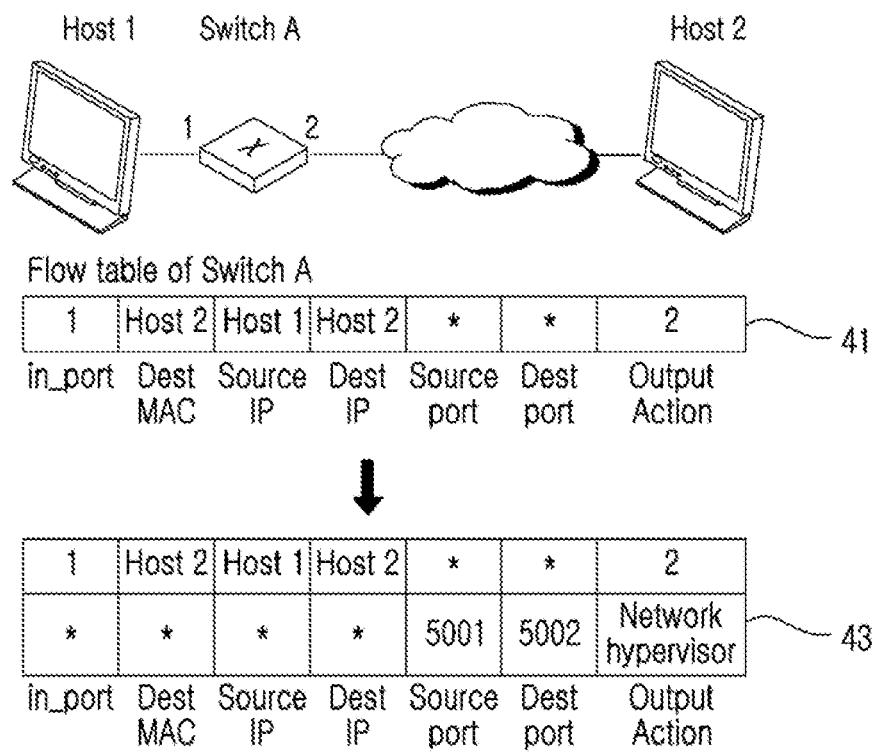
FIG. 6 illustrates indicator rules installed for the flow table of a switch.

Referring to FIG. 6, which illustrates indicator rules installed for the flow table of a switch, it is assumed first that a virtualization type table (not shown) allocated to an arbitrary tenant includes virtualization type policies of an end vt with a low priority and an application vt with a high priority. If the flow table 41 of Switch A, which is the first switch in the path between Host 1 and Host 2, already has a physical flow rule virtualized with the end vt, the first packet from port 5001 to port 5002 may be forwarded by the physical flow rule virtualized with the previously installed end vt even though there is a virtualization type policy of the application vt in the virtualization type table. Thus, a proper flow rule from port 5001 to port 5002 may not be created. This may occur because the physical flow rule of a coarser-grained virtualization type was previously installed on the physical switch, as described above.

To resolve this problem, the indicator rule installation part 300 may create an indicator rule 43 in the physical switch in cases where a virtualization type policy of the application vt is present in the virtualization type table. Here, an indicator rule 43 may be a rule for forwarding the first new application packet to the network hypervisor in a higher priority than the previously installed physical flow rule. Accordingly, Switch A can forward the first packet from port 5001 to port 5002 to the network hypervisor instead of Host 2.

Thus, by way of the indicator rule installation part 300 according to an embodiment of the invention, a physical flow rule can be installed according to a virtualization type policy of the application vt, even if a physical flow rule of a coarser-grained virtualization type was previously installed on the physical switch.

Since the previous hop of the ingress switch is the source host, the flow rule in the ingress switch should match the host address. In other words, as the flow rule of the ingress switch has at least the end vt, the indicator rule installation part 300 may install the indicator rule only for the application vt.

The pf virtualization part 400 may check the generated physical flow rule to determine whether or not there is collision with physical rules previously installed on the physical switch and, if the check shows that there is collision with a previously installed physical rule, may perform the virtualization for the created physical flow rule by using a rule map.

Here, virtualizing a physical flow rule can mean using the rule map to expand the virtualization type of a colliding physical flow rule into a finer-grained virtualization type.

Here, a rule map is a structure for managing the mapping of virtual flow rules and physical flow rules when virtualizing a virtual flow rule into a physical flow rule.

Describing in further detail the virtualization of a physical flow rule when there is collision, the pf virtualization part 400 may check the pf.A of the physical flow rule that is to be installed to determine whether or not it collides with a previously installed physical flow rule if there is a physical flow rule already installed on the physical switch. Such collision may only occur when the virtual flow rules are all virtualized with the hop vt (hop-merged vt or hop-isolated vt). The virtualization occurs at the flow rule level, and when virtual flow rules are virtualized to physical flow rules of the hop vt and installed on a physical switch, previously installed physical flow rules may cause a situation in which it is impossible to forward packets, i.e., a collision.

When a collision occurs as described above, the pf virtualization part 400 may use the rule map to expand the physical flow rule causing the collision to an end vt in performing the virtualization.

Figure 7:
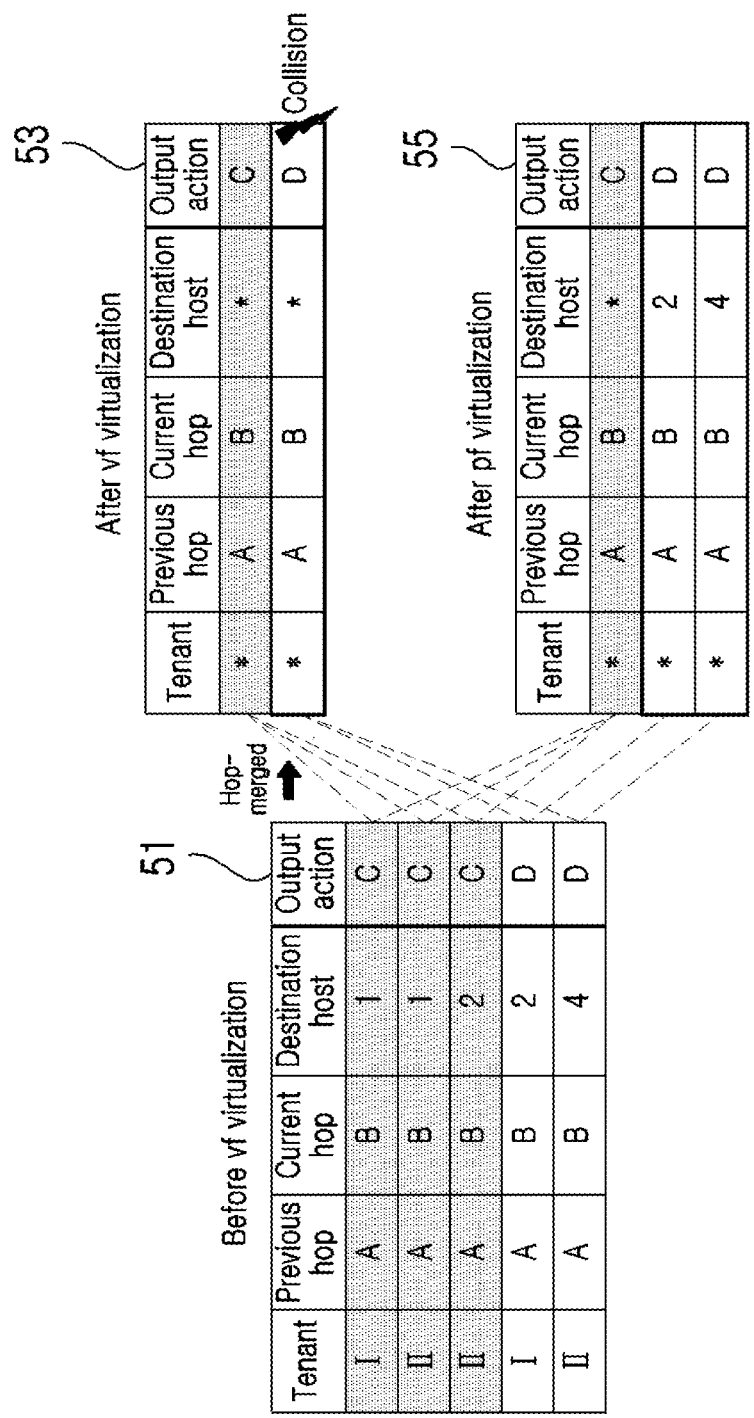
FIG. 7 illustrates an example of pf virtualization.

Referring to FIG. 7, which illustrates an example of pf virtualization, the table 51 illustrated on the left in FIG. 7 shows virtual flow rules for each tenant created from the tenant controller. When the virtual flow rules undergo virtualization with the hop-merged vt, the flow rules having matching hop addresses (previous hop address and current hop address) are merged, as in the upper right table 53 of FIG. 7. That is, the top three flow rules may be merged with the hop-merged vt, and the merged flow rules may be installed on the physical switch, whereby the packets sent from A to B can be forwarded to C. However, as the remaining flow rules are merged as the hop-merged vt and installed on the physical switch, a collision would occur with the output action performed by a previously installed physical flow rule. That is, whereas the previously installed physical flow rule forwards packets to C, the physical flow rule that is to be installed forwards packets to D, causing a collision.

As such, the pf virtualization part 400 may virtualize the physical flow rule that collides with the previously installed physical flow rule into an end vt by using the existing physical flow rule information included in the rule map and may perform the virtualization for the physical flow rules as shown in the lower right table 55 of FIG. 7.

When the virtualized physical flow rules are created by way of the pf virtualization part 400, the network hypervisor may install the virtualized physical flow rules on the physical switch and may update the physical flow rules in the rule map. Also, if it is determined that there are no collisions, then the network hypervisor may install the physical flow rules on the physical switch.

Figure 8:
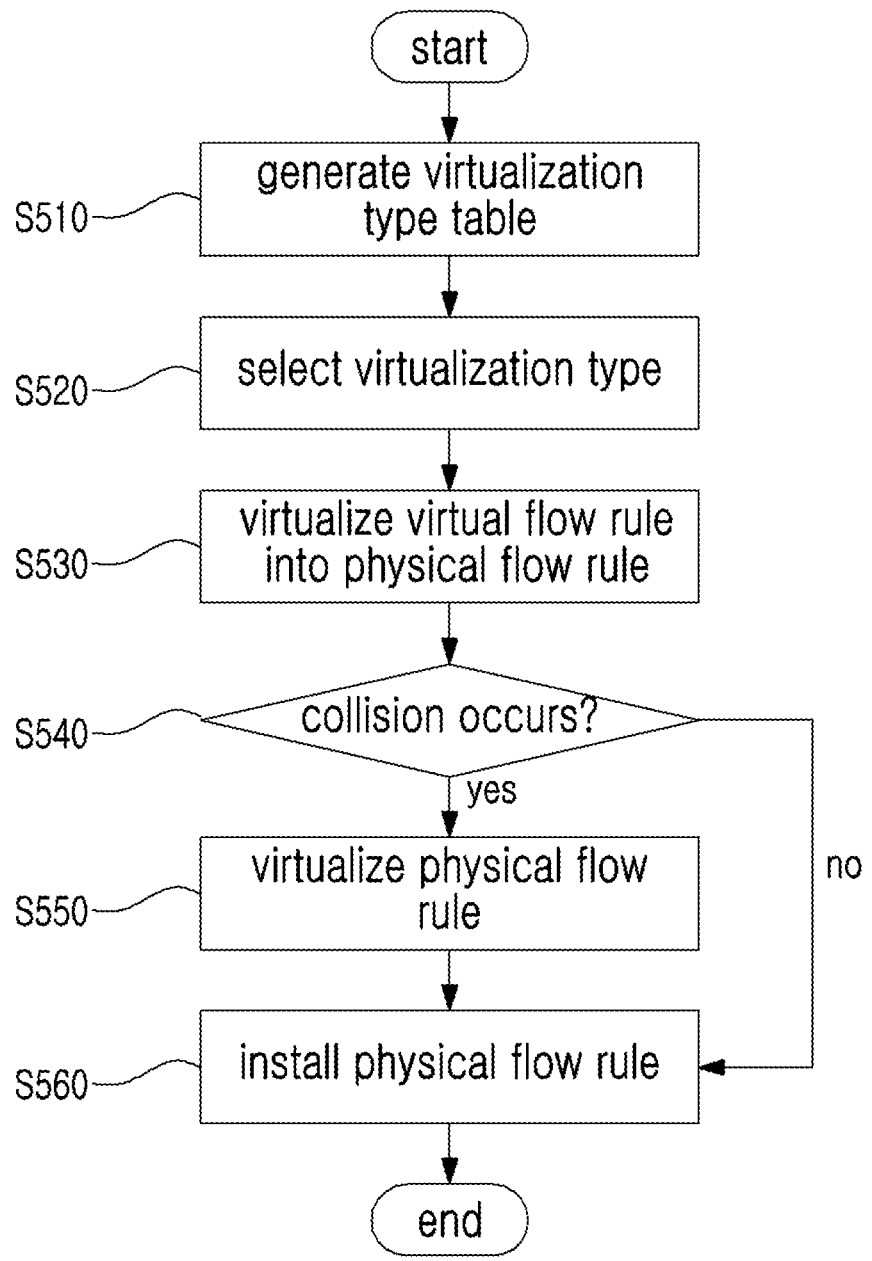
FIG. 8 is a flowchart of a flow rule virtualization method according to an embodiment of the invention.

FIG. 8 is a flowchart of a flow rule virtualization method according to an embodiment of the invention. In the descriptions that follow, detailed descriptions that are redundant over the descriptions already provided above are omitted.

Referring to FIG. 8, step S510 may include generating a virtualization type table by using virtualization type policies obtained from tenants. Here, each entry of the generated virtualization type table can be composed from a virtualization type policy, and the items of the virtualization type table can include switch ID, flow information, virtualization type, and priority.

Step S520 may include selecting a virtualization type for a virtual flow rule generated from a tenant controller by using the virtualization type table generated in step S510.

For the selection of the virtualization type, step S520 can further include the step of comparing the virtual switch ID with the switch ID of the virtualization type table and comparing the matching field of the virtual flow rule with the flow information of the virtualization type table to find matching virtualization type policies and the step of selecting the virtualization type policy having the highest priority from among the matching virtualization type policies.

Step S530 may include virtualizing the virtual flow rule into a physical flow rule according to the selected virtualization type.

Step S540 may include checking to determine whether or not the physical flow rule collides with a physical flow rule previously installed on the physical switch onto which the physical rule is to be installed.

If it is determined, based on the result of step S540, that there is collision between the physical flow rule and a physical flow rule already installed on the physical switch, then step S550 may include using a rule map to virtualize the physical flow rule created in step S530. Here, step S550 can perform the virtualization by expanding the physical flow rule to the end vt by using the rule map.

In step S560, when virtualization is performed for the physical flow rule after it is determined that a collision occurs, the network hypervisor may install the virtualized physical flow rule on a physical network such as a physical switch, for example. On the other hand, if it is determined that a collision does not occur, then the network hypervisor may install the physical flow rule on the physical network.

The following presents a performance comparison between a flow rule virtualization apparatus 10 and method according to an example embodiment of the invention and OVX (OpenVirteX), an existing network virtualization technique.

Number of Flow Rules

Figure 9A:
FIG. 9A to FIG. 9C illustrate examples of topology forms.
Figure 9B:
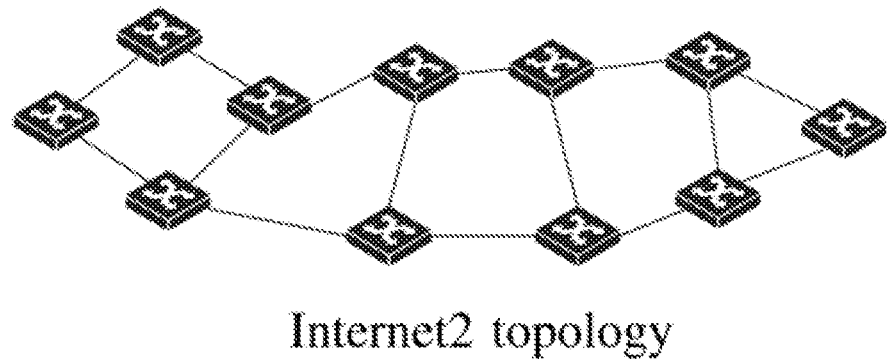
Figure 9C:
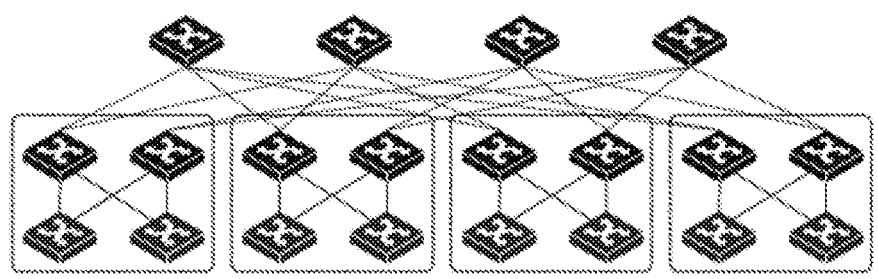
Figure 9D:
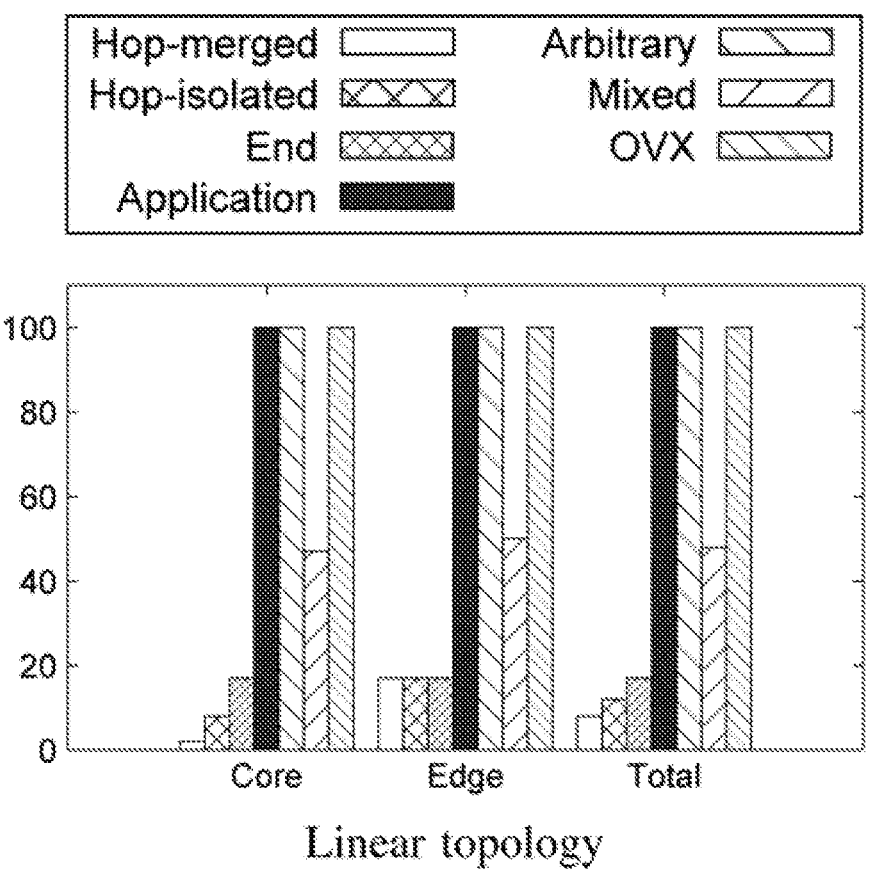
FIG. 9D to FIG. 9F illustrate comparisons of the number of flow rules for the topology forms illustrated in FIG. 9A to FIG. 9C.
Figure 9E:
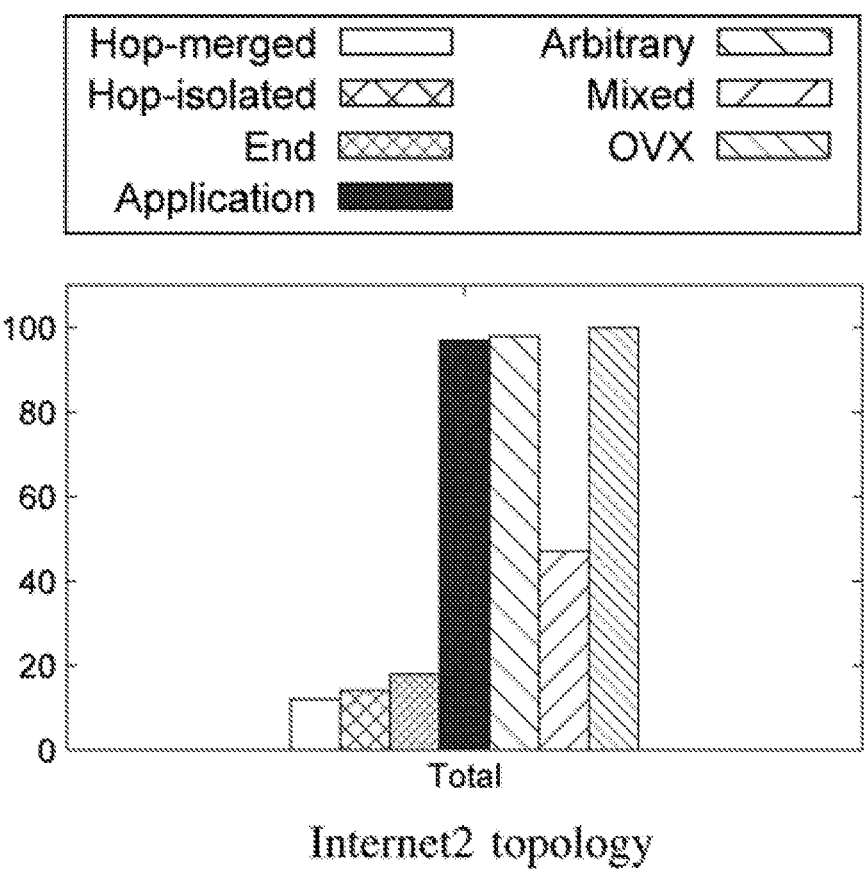
Figure 9F:
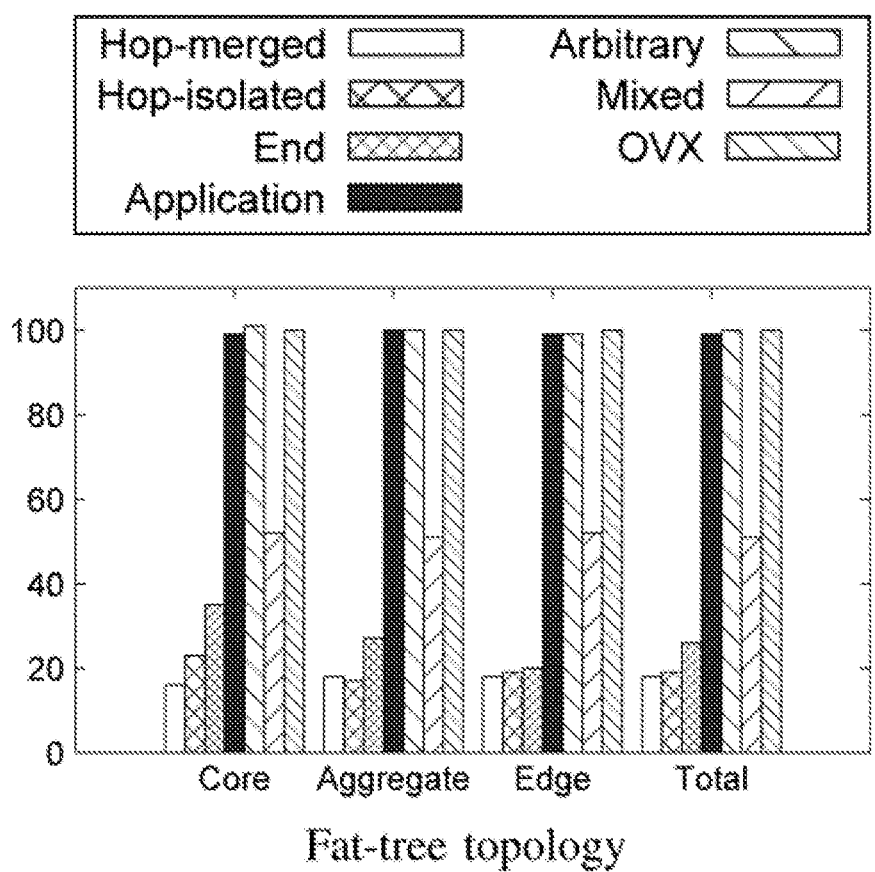

FIG. 9A to FIG. 9C illustrate examples of topology forms, and FIG. 9D to FIG. 9F illustrate comparisons of the number of flow rules for the topology forms illustrated in FIG. 9A to FIG. 9C.

Referring to FIG. 9A to FIG. 9F, the ratio of flow rules shown for each topology form represents the ratio of the total number of flow rules of each switch to the number of OVX flow rules. Whereas OVX shows almost the same numbers as the total number of flow rules, the example embodiment of the invention reduces the number of flow rules by 91 [%] for the hop-merged vt in the linear topology and by 87 [%] and 82 [%] for the Internet2 topology and fat-tree topology, respectively. The hop-isolated vt and end vt cases also decreased the number of flow rules by similar amounts to those of the hop-merged vt.

Computing Resource Usage

Performance in terms of computing resource usage can be compared based largely on the bandwidth of the control channel that connects the network hypervisor with the physical network and the amount of CPU at the network hypervisor.

Table 2 shown below represents the numbers and bandwidths of flow rule modification packets.

TABLE 2

| Case | Linear | Fat-tree | Internet2 |
|---|---|---|---|
| Hop-merged | 1.8/321 | 4.0/689 | 2.8/485 |
| Hop-isolated | 2.6/460 | 4.5/761 | 2.9/512 |
| End | 5.3/902 | 10.4/1749 | 5.9/1003 |
| Application | 23.3/3939 | 37.4/6317 | 30.2/5131 |
| Arbitrary | 24.4/3650 | 34.1/5093 | 26.9/4037 |
| Mixed | 11.3/1839 | 20.0/3227 | 13.3/2152 |
| OVX | 22.0/4050 | 37.3/6914 | 28.6/5314 |

The data in Table 2 above represents the numbers/bandwidths of flow rule modification packets. In Table 2, the example embodiment of the invention shows a decreased number of requests for a new flow compared to OVX. Also, whereas OVX uses the maximum bandwidth, the message length is shorter and the bandwidth is lower for the example embodiment of the invention compared to OVX, as the example embodiment of the invention adds an action that sets only the destination MAC address to support hop-based packet forwarding.

Figure 10:
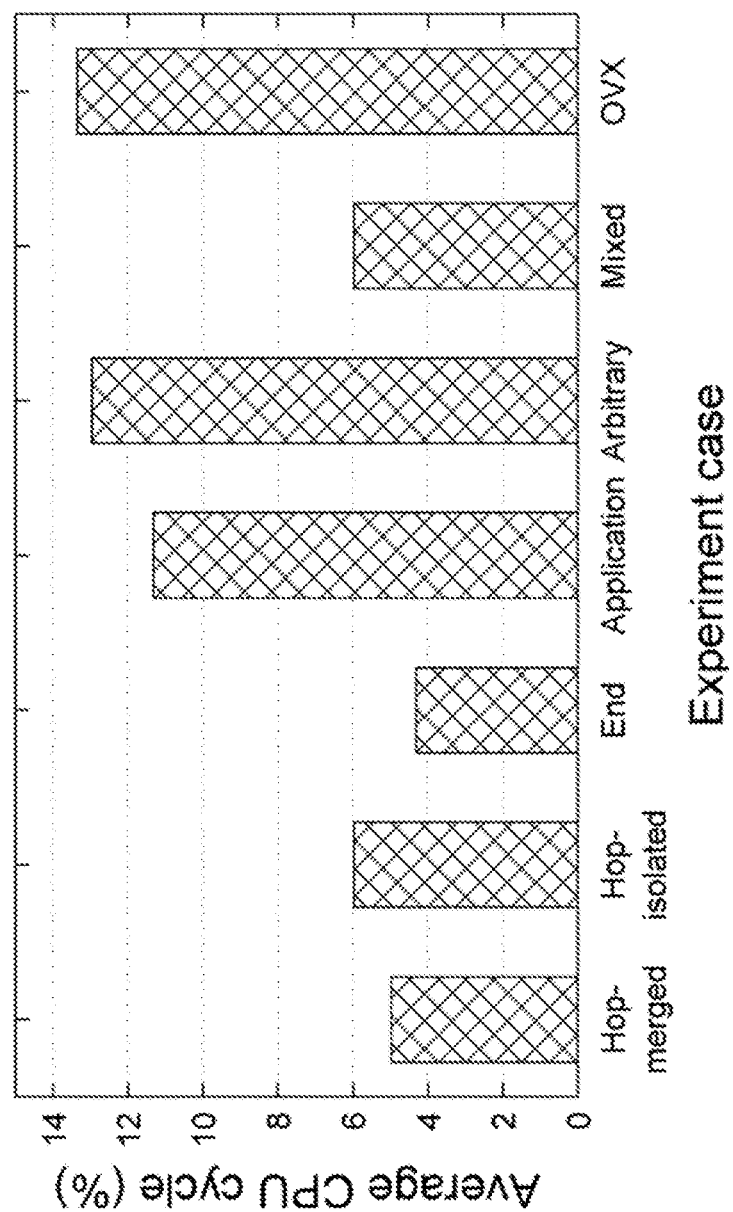
FIG. 10 illustrates CPU usage in a network hypervisor.

FIG. 10 illustrates CPU usage in a network hypervisor.

Referring to FIG. 10, it can be observed that the usage amount of the CPU has been decreased by more than half compared with OVX. As there is little decrease in the number of flow rules for the application vt and the arbitrary vt, there is likewise little difference in the amount of CPU usage.

Overhead

Table 3 shown below shows the additional delay times for virtualizing flow rules.

TABLE 3

| | Delay | Increased delay |
|---|---|---|
| OVX | 5.05 | — |
| Hop-merged | 5.74 | 0.69 |
| Hop-isolated | 5.90 | 0.84 |
| End | 5.86 | 0.81 |

TABLE 3-continued

| | Delay | Increased delay |
|---|---|---|
| Application | 5.86 | 0.80 |
| Arbitrary | 5.84 | 0.79 |
| Mixed | 5.98 | 0.92 |

Referring to Table 3 above, the average increased delay is approximately 0.8 [ms]. However, since the increased delay occurs only once during flow rule installation, it can be seen that there may not be a significant effect on the overall packet forwarding.

As described above, a flow rule virtualization apparatus 10 and method according to an embodiment of the invention can resolve the problem of scalability in P-NV by utilizing the virtualization of flow rules to decrease the number of flow rules and control channel bandwidth.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents.

Therefore, various other implementations, various other embodiments, and equivalents of the invention disclosed in the claims are encompassed by the scope of claims set forth below.

What is claimed is:

1. A flow rule virtualization method comprising:
   (a) generating a virtualization type (VT) table, wherein the virtualization type table describes virtualization types classified according to a level of merging, wherein said virtualization types includes a hop-based hop VT, an end-host-based end VT, an application-based application VT, and an arbitrary VT for cases that do not allow merging of flows within a tenant, wherein the hop VT includes a hop-isolated VT for merging the flows within a tenant and a hop-merged VT for merging the flows between tenants;
   (b) selecting a virtualization type for a virtual flow rule generated from a tenant controller by using the virtualization type table, the virtualization type representing a degree of mapping between the virtual flow rule and a physical flow rule executed on a physical network;
   (c) virtualizing the virtual flow rule into the physical flow rule according to the selected virtualization type;
   (d) virtualizing the physical rule by using a rule map, wherein the rule map further comprises: checking whether or not the physical flow rule collides with a physical flow rule previously installed on the physical switch, wherein, when it is determined that the physical flow rule and the physical flow rule previously installed on the physical switch collide, the physical flow rule is virtualized expanded to the end-host-based end VT by using the rule map; and
   (e) installing the virtualized physical flow rule on the physical switch.

2. The flow rule virtualization method of claim 1, wherein the virtualization type table includes at least one or more virtualization type policies obtained from tenants, and items of the virtualization type table include switch ID, flow information, virtualization type, and priority.

3. The flow rule virtualization method of claim 2, wherein the priority represents an order in which the at least one or more virtualization type policies are applied to the virtual flow rule.

4. The flow rule virtualization method of claim 3, wherein said step (b) comprises: comparing a virtual switch ID with a switch ID of the virtualization type table, comparing a matching field of the virtual flow rule with the flow information to find matching virtualization type policies from among the at least one or more virtualization type policies, and selecting a virtualization type of a virtualization type policy having a highest priority from among the matching virtualization type policies.

5. The flow rule virtualization method of claim 1, wherein said step (c) further comprises: installing an indicator rule on the physical switch when if the selected virtualization type is the application based application vt and a physical flow rule of a coarser-grained virtualization type than the application based application vt is installed on the physical switch, wherein the indicator rule has a higher priority than the physical flow rule of the coarser-grained virtualization type and is configured to forward a first application packet of the physical switch to a network hypervisor.

6. A flow rule virtualization apparatus comprising:
   a processor;
   a memory coupled to the processor and configured to store instructions;
   wherein the processor, when executing the instructions, is configured to perform:
   generating a virtualization type (VT) table, wherein the virtualization type table describes virtualization types classified according to a level of merging, wherein said virtualization types includes a hop-based hop VT, an end-host-based end VT, an application-based application VT, and an arbitrary VT for cases that do not allow merging of flows within a tenant, wherein the hop VT includes a hop-isolated VT for merging the flows within a tenant and a hop-merged VT for merging the flows between tenants;
   selecting a virtualization type for a virtual flow rule generated from a tenant controller by using the virtualization type table, the virtualization type representing a degree of mapping between the virtual flow rule and a physical flow rule executed on a physical network;
   virtualizing the virtual flow rule into the physical flow rule according to the selected virtualization type;
   virtualizing the physical rule by using a rule map, wherein the rule map further comprises: checking whether or not the physical flow rule collides with a physical flow rule previously installed on the physical switch, wherein, when it is determined that the physical flow rule and the physical flow rule previously installed on the physical switch collide, the physical flow rule is virtualized expanded to the end-host-based end VT by using the rule map; and
   installing the virtualized physical flow rule on the physical switch.

7. The flow rule virtualization apparatus of claim 6, wherein the processor is further configured to: install an indicator rule on the physical switch when if the selected virtualization type is the application based application vt and a physical flow rule of a coarser-grained virtualization type than the application based application vt is installed on the physical switch, the indicator rule is configured to have a higher priority than the physical flow rule of the coarser-grained virtualization type and is configured to forward a first application packet of the physical switch to a network hypervisor.

\* \* \* \* \*